United States Patent Office 2,860,130
Patented Nov. 11, 1958

2,860,130
METHYL ALGINATE

William H. McNeely and John J. O'Connell, San Diego, Calif., assignors to Kelco Company, San Diego, Calif., a corporation of Delaware No Drawing. Application November 1, 1954
Serial No. 466,234

7 Claims. (Cl. 260—209.6)

This invention relates to methylated alginic acid or methyl alginate.

Alginic acid has a carbohydrate type of structure in which the repetitive unit is as follows:

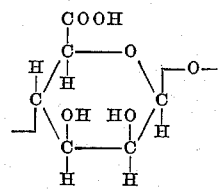

Heretofore the carboxyl group indicated above has been methylated for analytical purposes, e. g., to determine the structure of alginic acid and the length of its chain. However, in the process of methylation, the alginic acid is degraded. The degraded product, although it may be highly methylated, does not have colloidal properties, or it possesses colloidal properties in greatly reduced degree.

It is an object of the present invention to provide methylated alginic acid or methyl alginate which is characterized by a high degree of methylation, which retains colloidal properties, and which is not degraded or is degraded in only a slight degree.

Another object is to provide a method of methylating alginic acid to produce a non-degraded, highly methylated product having colloidal properties.

Other objects of the invention will be apparent from the ensuing description and the appended claims.

In accordance with the invention, we start with a water-soluble salt of alginic acid, preferably an alkali metal alginate, and most advantageously sodium alginate. A suitable methylating agent is employed, preferably dimethyl sulphate. A suitable reaction medium or vehicle is employed which is immiscible with or only slightly miscible with water, preferably carbon tetrachloride, petroleum ether or isopropyl ether. The methylation reaction is preferably carried out in the presence of a small amount of water, preferably about 30 to 40% of the weight of alginate. The reaction is carried out at a low temperature, preferably room temperature or a temperature not greatly in excess of room temperature.

By this means there is produced a methylated alginic acid or methyl alginate having a high degree of methylation, e. g., 35% or more of the carboxyl groups being methylated as shown by saponification. The methyl alginate is not degraded or is degraded in only a slight degree and it retains desirable colloidal properties. This is shown by the fact that a 1 to 2% aqueous solution has a greatly increased viscosity as compared to water, and by the fact that the methyl alginate is an efficient emulsifying agent, emulsion stabilizer, and foam stabilizer.

By reason of the methylation of the carboxyl groups, the methylated product is more stable than free alginic acid and it has a much greater tolerance of polyvalent metal ions than sodium alginate.

The following specific example will serve to illustrate the methylation procedure and the properties of the end product of the present invention: 50 parts by weight of sodium alginate containing 87.5% solids, 52 parts of dimethyl sulphate, and 40 parts of ammonium bicarbonate were dispersed in 160 parts of carbon tetrachloride and 8 parts of water. The dispersion was allowed to react with agitation for 5 hours at 25° C. The resulting product was 57% methylated as shown by saponification. It was a stable product having a high degree of tolerance to polyvalent metal ions.

In place of carbon tetrachloride, other non-aqueous solvents may be used which are insoluble or only slightly soluble in water, e. g., low boiling petroleum ether or isopropyl ether. Other buffering agents than ammonium bicarbonate may be used, e. g., sodium bicarbonate and ammonium carbonate. The proportion of water used may vary from 15 to 100% of the weight of alginate calculated as anhydrous alginic acid. The proportion of organic solvent used is preferably 3 to 4 times the weight of alginate calculated as anhydrous alginic acid. The proportion of dimethyl sulphate is preferably about 130 parts per 100 parts of alginate calculated as anhydrous alginic acid, but the proportion may vary from 60 to 270 parts of dimethyl sulphate per 100 parts of alginate calculated as anhydrous alginic acid.

The reaction product may be used as is after removing the reaction solvent, or it may be purified by removing the inorganic salts. Purification may be accomplished by aqueous alcohol extraction. The reaction product, after separating liquid reaction medium, may be washed with 50 to 70% aqueous methyl, ethyl or isopropyl alcohol. Even 100% alcohol may be used, however. Such solvents selectively dissolve the inorganic salts and leave a purified residue of methyl alginate.

The methyl alginate of the present invention has utility inter alia as a thickening agent in food products and in textile printing pastes, as an emulsifying agent, and as a foam stabilizer, e. g., for stabilizing beer foam.

By way of example, methyl alginate of the invention which was 60% methylated was dissolved in water to produce a solution having a viscosity of 515 cps. It was used to emulsify equal parts of mineral oil and water, producing an emulsion having a viscosity of 5300 cps. Only slight oil separation occurred after 40 hours at 50° C. The emulsion was more stable than the same emulsion using sodium alginate rather than methyl alginate as the emulsifying agent.

It will, therefore, be apparent that a methyl alginate has been produced which is more stable than free alginic acid, which is not degraded, which has useful colloidal and surface active properties and which is tolerant to polyvalent metal ions. It will also be apparent that a novel method of methylating alginic acid has been provided which is capable of producing a product of the character described.

We claim:

1. A method of producing methyl alginate comprising reacting a water-soluble salt of alginic acid with dimethyl sulphate in the presence of a non-aqueous liquid reaction medium which is only slightly miscible with water, such reaction being carried out at a relatively low temperature and in the presence of a buffering agent and a small amount of water.

2. The method of claim 1 wherein said salt is an alkali metal alginate.

3. The method of claim 1 wherein said salt is sodium alginate.

4. The method of claim 1 wherein said reaction medium is petroleum ether.

5. The method of producing a highly methylated alginic acid without substantial degradation which comprises reacting sodium alginate with dimethyl sulphate at a temperature not greater than about 75° C. in a reaction medium of the class consisting of carbon tetrachloride, petroleum ether and isopropyl ether and in the presence of a buffering agent and a small amount of water.

6. The method of claim 5 wherein said buffering agent is selected from the group consisting of sodium bicarbonate, ammonium bicarbonate and ammonium carbonate, and the amount of water does not exceed about 40% of the weight of the alginate calculated as alginic acid.

7. Methyl alginate having not less than about 35% of the carboxyl groups methylated, said methyl alginate being substantially in an undegraded state, and the remaining carboxyl groups being present substantially as water-soluble salt groups.

References Cited in the file of this patent
UNITED STATES PATENTS 1,924,575   Spring ---------------- Aug. 29, 1933

OTHER REFERENCES

Hirst et al.: Journal Chemical Society, pp. 1880 et seq., 1939.

Whistler et al.: "Polysaccharide Chemistry," published by Academic Press, N. Y., 1953 (p. 346 relied on).